United States Patent [19]

Forshee

[11] 4,412,615

[45] Nov. 1, 1983

[54] ENGINE CRADLE

[75] Inventor: David J. Forshee, 11 Misty Morning Dr., Hilton Head Island, S.C. 29228

[73] Assignee: David J. Forshee

[21] Appl. No.: 253,260

[22] Filed: Apr. 13, 1981

[51] Int. Cl.$^3$ ............................................. B65D 85/68
[52] U.S. Cl. .................................... 206/319; 206/386; 410/31
[58] Field of Search ............... 206/319, 317, 386, 600; 108/55.1, 55.3; 248/676; 410/46, 47, 49, 50, 31, 32, 33, 34, 35, 36, 42; 211/194, 188; 14/13

[56] References Cited

U.S. PATENT DOCUMENTS

| | | | |
|---|---|---|---|
| 34,023 | 12/1861 | Lerk et al. | 14/13 |
| 1,065,979 | 7/1913 | Spencer | 248/676 |
| 1,424,190 | 8/1922 | Cole et al. | 248/676 |
| 1,736,172 | 11/1926 | Raymond | 108/55.1 |
| 2,198,674 | 4/1940 | Lord | 410/31 |
| 2,515,428 | 7/1950 | Scott et al. | 206/319 |
| 2,521,502 | 9/1950 | Byers | 206/319 |
| 2,613,807 | 10/1952 | Higbee | 206/319 |
| 2,632,567 | 3/1953 | Richtmyer | 108/55.1 |
| 3,022,031 | 2/1962 | Bauer et al. | 410/49 |
| 3,094,951 | 6/1963 | Levinson | 211/188 |
| 3,405,665 | 10/1968 | Slonim | 108/55.1 |
| 3,699,901 | 10/1972 | Cook | 108/55.1 |
| 3,929,272 | 12/1975 | Bowles | 206/319 |
| 4,098,409 | 7/1978 | Massey | 206/319 |
| 4,305,508 | 8/1978 | Rodgers | 410/49 |

FOREIGN PATENT DOCUMENTS

| | | | |
|---|---|---|---|
| 838429 | 4/1970 | Canada | 410/49 |
| 709561 | 5/1954 | United Kingdom | 206/46 |

*Primary Examiner*—William Price
*Assistant Examiner*—David Fidei
*Attorney, Agent, or Firm*—Benjamin W. Colman

[57] ABSTRACT

An engine cradle fabricated of integrally molded unitary plastic components including four corner posts, a front transverse bar connected to a first pair of corner posts and a rear yoke plate member connected to a second pair of corner posts, a pair of lateral force distributing x-shaped cross members connected to both said pairs of corner posts, engine rest surfaces and movement restraining means at the upper distal ends of the corner posts in engagement with an engine carried by the cradle, and fastening means conjoining the plastic components together into an engine supporting and protecting device.

18 Claims, 19 Drawing Figures

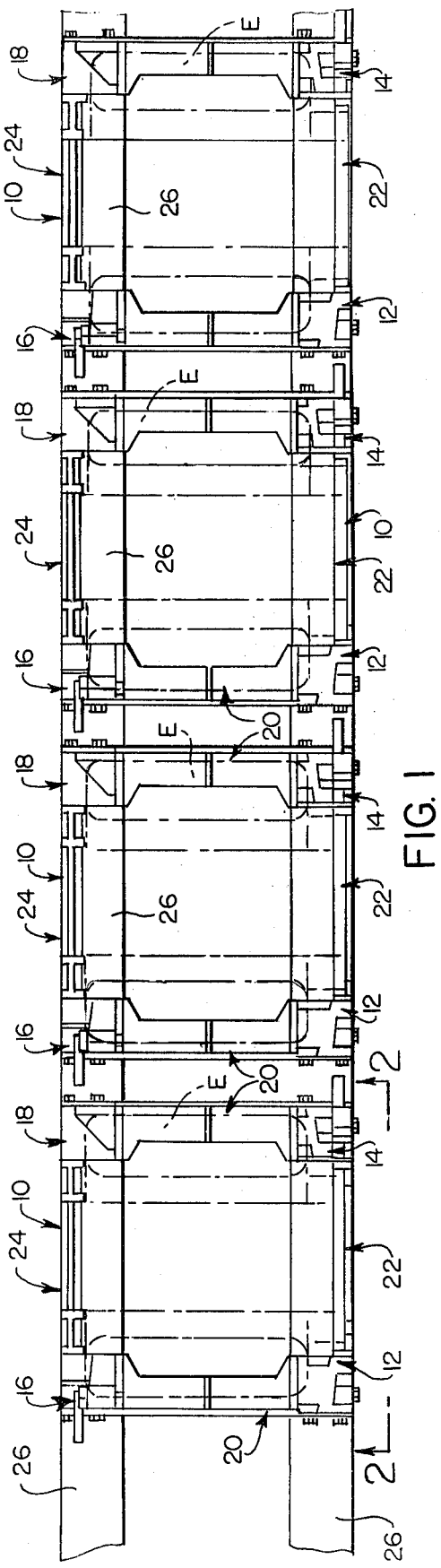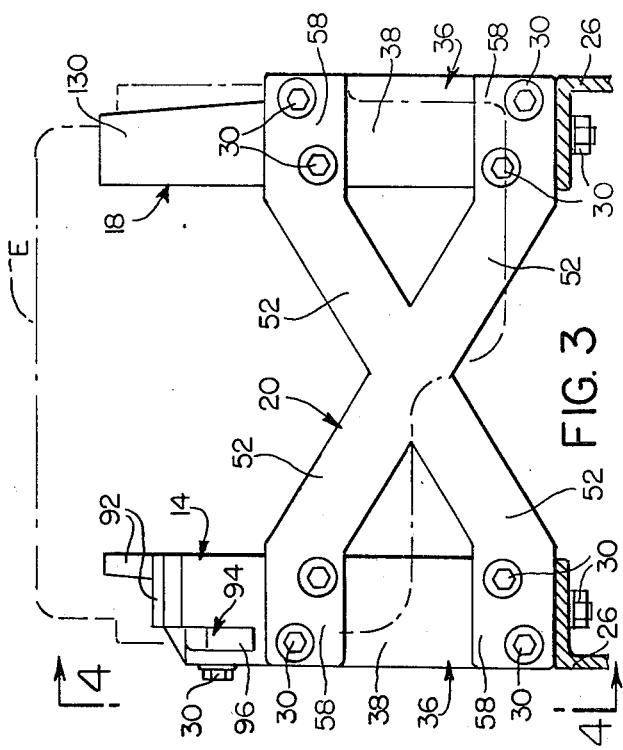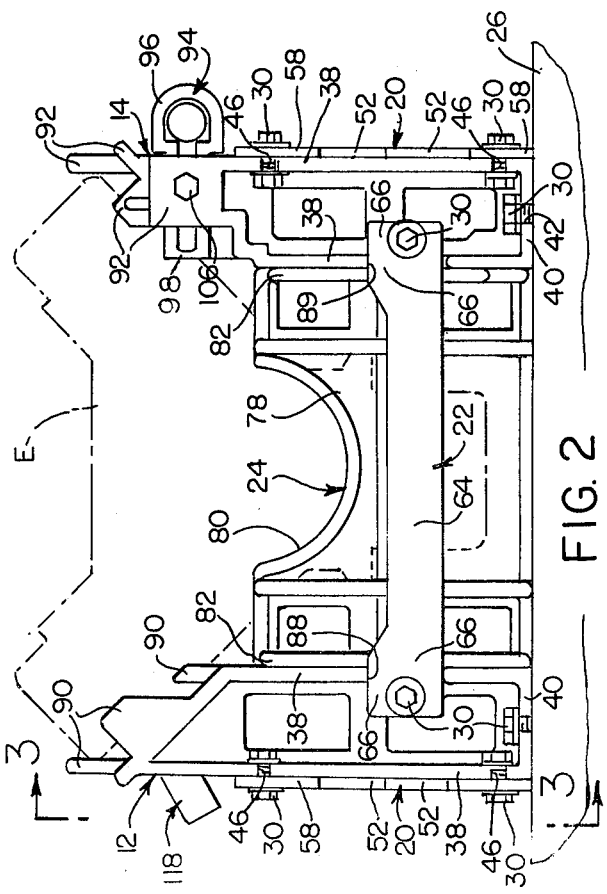

ENGINE CRADLE

BACKGROUND OF THE INVENTION

The invention relates to an assembly of separable plastic components and members forming a supporting cradle for engine units requiring a protective translation device for their movement from one station or location to another, with rapid manual securement of the engine to and its release from the cradle. The cradles can be mounted on a conveyor line, a platform or rack for transportation by a lift truck to a motorized common carrier or railroad car or secured to equipment in any other material handling system.

In the past, engine cradles have been made of steel and, although adequately supported, they have not been as protective of their loads in translation as is required. Additionally, means for locking the engine into the cradle have been complex mechanisms often difficult to manipulate for engagement of the engine in and its disengagement from the cradle.

In numerous instances, costly engine units have become displaced in their supporting cradles during translation so that substantial damage has occurred. Often also, exterior surfaces of the engines have been damaged by metal-to-metal contact with their supporting cradles, even though not significantly misplaced therein. Racks made of steel have increased substantially the load weight carried by trucks and railroad cars, and such added weight has been a severe burden, not only in costs of the material handling equipment but also on account of the substantially high energy requirements of the power units, i.e. lift trucks, truck engines and locomotives hauling these loads.

Losses in damaged engines and excessive weight transportation charges have become most significant factors in material handling costs. The instant invention was designed to provide a solution to this problem.

SUMMARY OF THE INVENTION

The invention generally comprises four integrally molded unitary plastic corner posts having upwardly facing rest surfaces and projections for supporting engagement with complementary surfaces of an engine to be loaded thereon, retractable engine engaging devices at the top of at least two of the corner posts, a pair of oppositely facing spaced apart integrally molded unitary plastic x-shaped cross members connected to the corner posts, an integrally molded unitary plastic front transverse bar connecting the two corner posts at the front end of the cradle and an integrally molded unitary plastic yoke plate member connecting the two corner posts at the rear end of the cradle. The engine, as the load unit for the cradle, is lowered into the cradle until elements of the engine come to rest upon supporting surfaces and in contact with adjacent upstanding projections or lugs of the corner posts. The engines are relatively complete when they are placed in these cradles, preparatory to testing and/or further attachment of components. There is little uniformity in the planes of the engine elements in bearing contact upon the four corner posts. By restraining the engine with retractable pins manually slidable into engine recesses at at least two of the corner posts, the engine is firmly secured in the cradle against upward displacement or dislocation during its translation. The bottom pads of the corner posts are slotted for the admission of fasteners to securely mount the cradle to longitudinally extending rails or platforms supportive of a plurality of these engine cradles.

When the plastic transfer cradles have been secured upon their supporting rails or platforms, the engines are simply lowered by hoist into the cradles and secured therein by the manually movable retractable pins. The engine cradles can be mounted and secured upon a conveyorized transfer slab or pallet for translation from one processing or testing station to another.

There are several advantages to the plastic transfer cradle of this invention. Hold down straps, linkage or levers now required to secure engines in steel cradles or racks are not necessary in the cradle construction of this invention. The weight of a plastic cradle embodying the invention is very much lighter than that of a steel rack or cradle for the same load unit carried thereby. Damage to engines carried by plastic cradles is substantially non-existent or trivial by comparison to the damage occurring when steel cradles are used, appreciably reducing the high cost of processing and maintaining the engines. The unit cost of a plastic cradle disclosed herein is substantially lower than that of comparable steel cradles now in use. Because the plastic component members are each integrally molded as unitary components and designed for bolt assembly, the replacement cost of any member is appreciably less than is required to maintain and reconstruct steel cradles by cutting, welding and reassembling. Because the plastic component members are color impregnated, according to customer or governmental requirements, no painting or repainting is necessary. Since plastic materials do not rust, there is no appreciable deterioration of the cradle, such as occurs in steel cradle or rack construction. Overall, the engine cradle of the instant invention embodies efficiencies of construction and service significantly greater than any attained by steel cradles or racks.

Various further and more specific objects, features and advantages of the invention will appear from the description given below, taken in conjunction with the accompanying drawings, illustrating by way of example preferred embodiments of the invention. Reference is here made to the drawings annexed hereto and forming an integral part of this specification.

BRIEF DESCRIPTION OF THE DRAWINGS

FIG. 1 is a top plan view of a preferred embodiment of the invention showing V-shaped engines (phantom lines) supported in cradles secured transversely to a pair of spaced apart longitudinally extending rails.

FIG. 2 is a front elevational view of an engine cradle, taken substantially on the line 2—2 of FIG. 1.

FIG. 3 is a side elevational view taken substantially on the line 3—3 of FIG. 2.

FIG. 3 is a top plan view of a side cross-member.

DETAILED DESCRIPTION OF THE PREFERRED EMBODIMENTS

Figure 4:
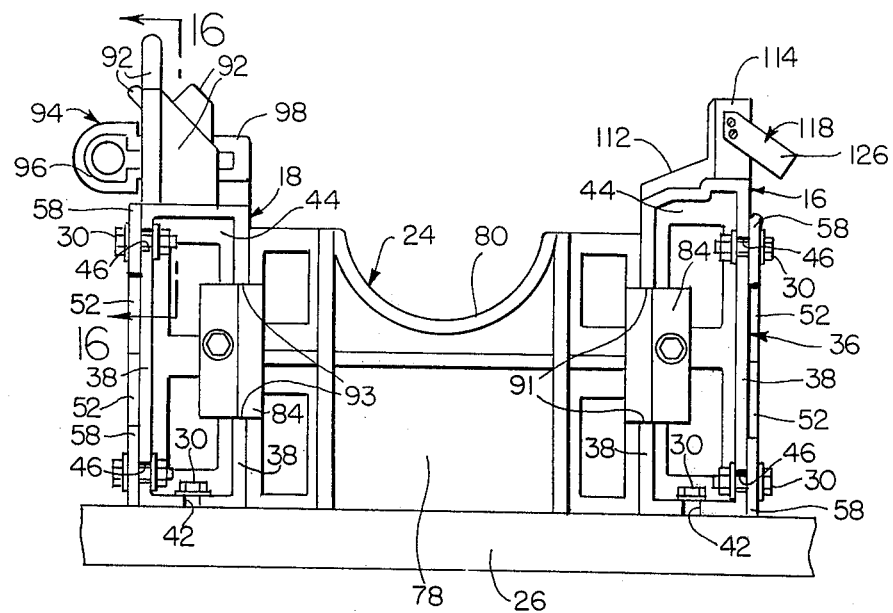
FIG. 4 is a rear elevational view of the engine cradle illustrated in FIG. 2, taken substantially on the line 4—4 of FIG. 3.

As illustrated in the several views of the drawings, the plastic engine cradle 10, a preferred embodiment of the invention, comprises the plastic corner posts 12, 14 16 and 18, connected by the lateral plastic X-shaped cross members 20, the plastic front transverse bar 22 and the plastic rear yoke plate member 24. These components forming the rectilinear cradle 10 are unitary integrally molded plastic components removably secured together by conventional fasteners for cradling engine units, particularly automotive engines, in their translation from station to station in processing operations or from location to location for storage or maintenance. The molded plastic components are preferably connected together by steel threaded fasteners, such for example as bolts and prevailing torque lock nuts. The weight of a plastic cradle 10 is in the range of from about 20 to 25% of the weight of conventional currently used steel engine cradles.

The plastic engine cradles 10 are preferably positioned, as illustrated in FIG. 1, transversely of a pair of spaced apart longitudinally extending rails 26, 26. These rails can be of a channel or angle construction, the bottom pads of the corner posts being bolted by threaded fasteners 30 to the horizontal upper surfaces of the rails. The fasteners 30 generally comprise headed bolts, washers and prevailing torque lock nuts. It will of course be understood by persons skilled in the art to which the invention pertains that other suitable fasteners or means of securement can be used.

The plastic component members of the cradle 10 are made of a super tough plastic nylon resin material, a thermoplastic polyamide, which optionally may be reinforced with glass fibers to increase their strength, stiffness and dimensional stability. The material is known in the trade as Zytel ST Nylon, manufactured by the E. I. DuPont de Nemours & Co., Inc. of Wilmington, Del. The resin material is produced in granules which are moldable into the plastic components described herein.

Each of the plastic corner posts 12, 14, 16 and 18 comprises a body 36 having a pair of spaced apart inner and outer side walls 38, 38, a bottom pad 40 provided with a slot 42 at its outwardly facing edge, whereby to receive the shank portion of the threaded fastener 30, and an intermediate transverse reinforcing web 44 connected to the inner surfaces of the side walls 38, 38. The outwardly facing wall 38 of each of the corner posts is slotted or notched at its frontal and rearward edges to receive the fasteners securing the x-shaped cross members 20 thereto.

The cross members 20 comprise the laterally extending arms 52 disposed in a vertical plane and terminating at their distal ends 58 beyond the vertical transverse inwardly directed flanges 54 at the distal ends of the stiffening reinforcing ribs 56 which extend inwardly from the arms 52. The vertical transverse flanges 54 abut the inner side walls 38 of each of the corner posts and help to maintain them square with the front transverse bar 22 and the rear yoke plate member 24.

The front transverse bar 22 comprises a body portion 64 having its distal ends 66, 66 secured by threaded fasteners 30 to the bosses 68, 68 integrally molded with the web portion 44 of each of the front corner posts 12 and 14. Integrally molded with the front body portion 64 is the rearwardly directed stiffening rib 70 which terminates at the transverse flanges 72, 72 abutting the inner walls 38, 38 of the front corner posts 12 and 14.

The rear yoke plate member 24 comprises the ribbed central body portion 78 terminating at its lateral edges on either side of the semi-circular cut-out 80, with a pair of transverse inwardly directed flanges 82, 82 that abut the inner side walls 38, 38 of the rear corner posts 16 and 18, and terminate with laterally outwardly directed front facing flanges 84, 84 secured by threaded fasteners 30 to bosses 86, 86 which are integrally molded with the medial web portions 44 of the corner posts 16 and 18.

The corner posts 12 and 14 are notched at 88, 89 respectively to admit the distal end flanges 66, 66 of the front transverse bar 22 thereinto, and the corner posts 16 and 18 are notched at 91, 93 respectively to admit the distal end flanges 84, 84 of the rear yoke plate member 24 thereinto.

Figure 5:
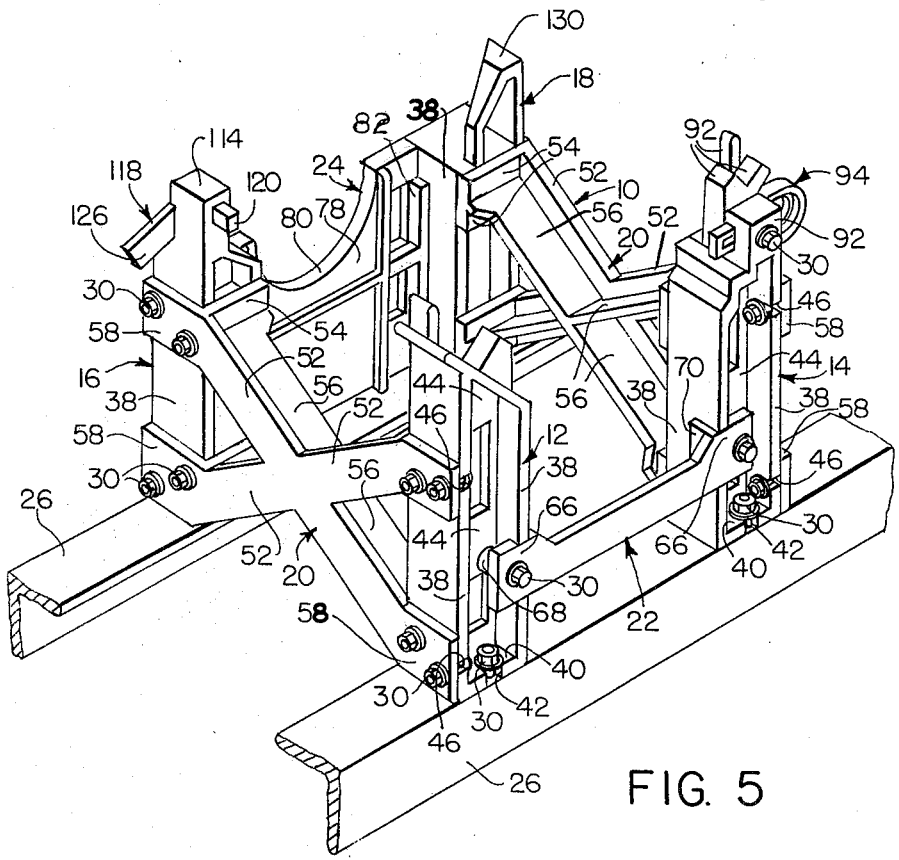
FIG. 5 is a perspective view of the engine cradle illustrated in FIGS. 2–4 inclusive.
Figure 6:
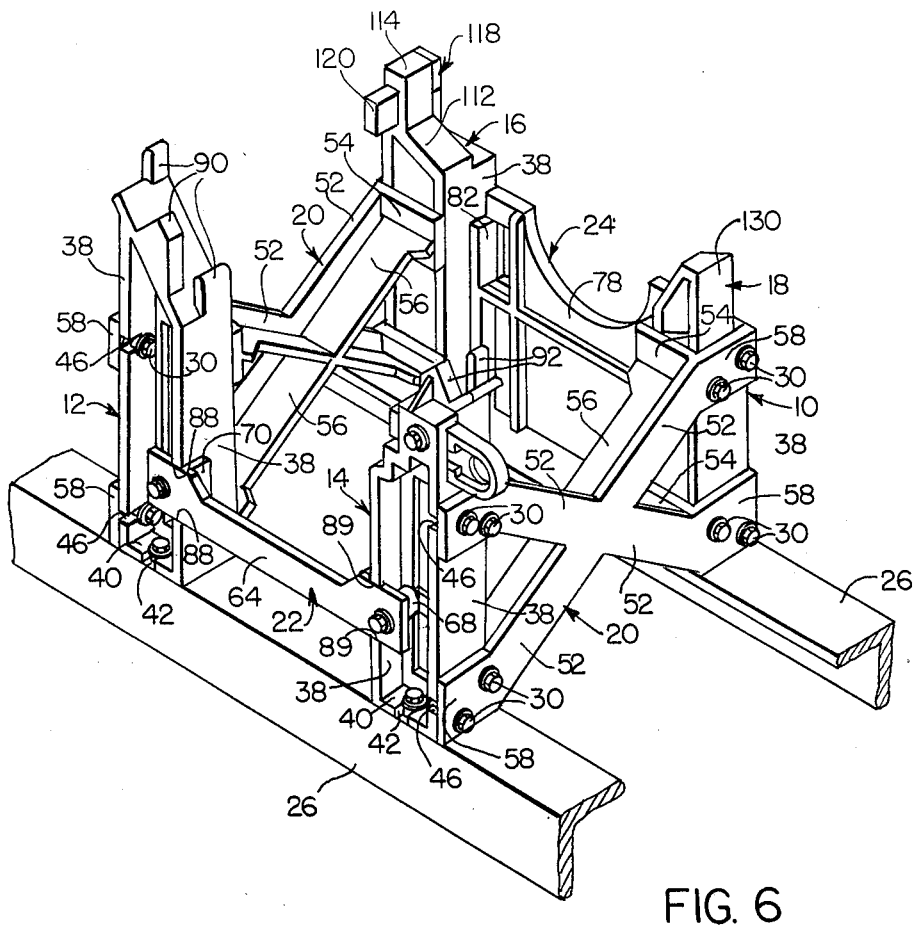
FIG. 6 is a perspective view of the engine cradle illustrated in FIGS. 2–4, taken from the side opposite that illustrated in FIG. 5.
Figure 7:
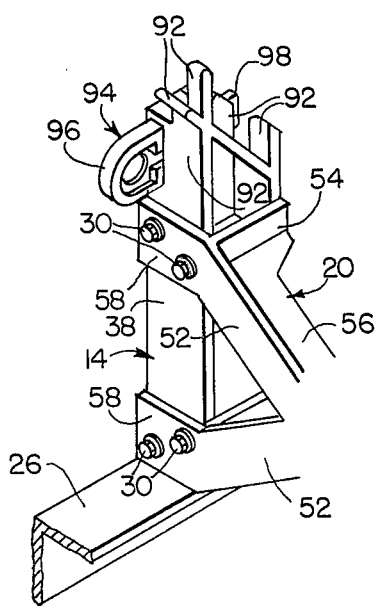
FIG. 7 is a rear perspective view of the right front corner post region of the engine cradle illustrated in FIGS. 5 and 6.
Figure 8:
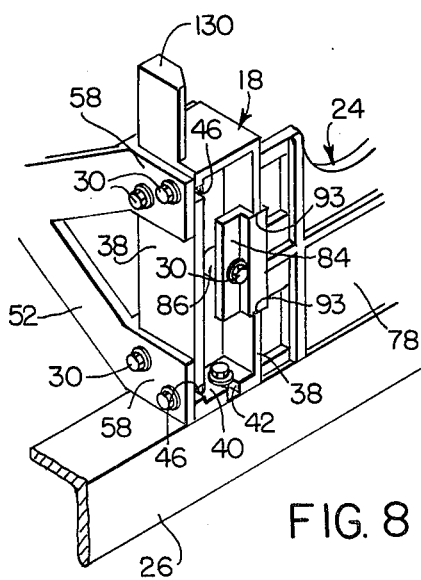
FIG. 8 is a rear perspective view of the right rear corner post region of the engine cradle illustrated in FIGS. 5 and 6.
Figure 9:
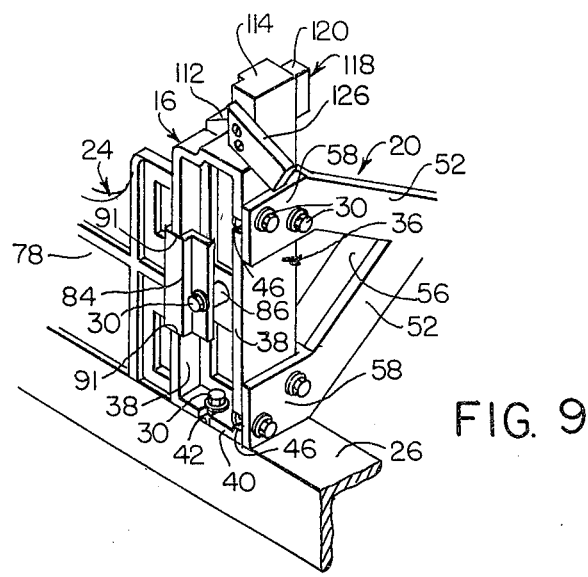
FIG. 9 is a rear perspective view of the left rear corner post region of the engine cradle illustrated in FIGS. 5 and 6.
Figure 10:
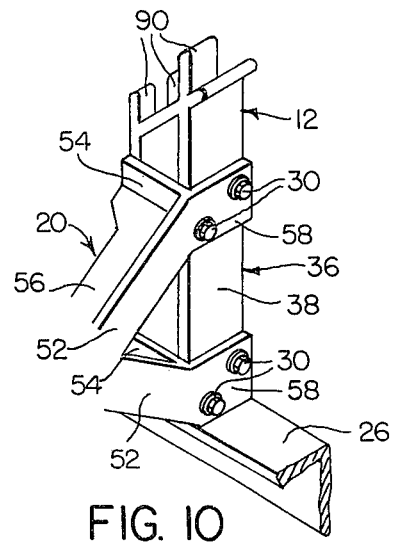
FIG. 10 is a rear perspective view of the left front corner post region of the engine cradle illustrated in FIGS. 5 and 6.
Figure 11:
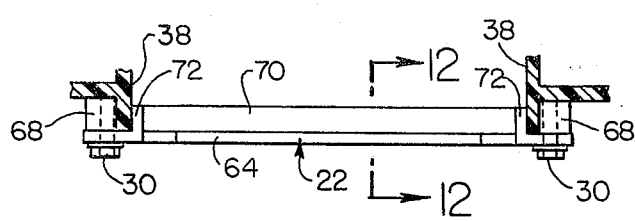
FIG. 11 is a top plan view of the front transverse bar connecting the front corner posts together.
Figure 12:
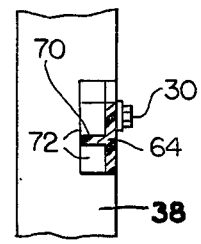
FIG. 12 is a vertical transverse sectional view taken substantially on the line 12—12 of FIG. 11.
Figure 13:
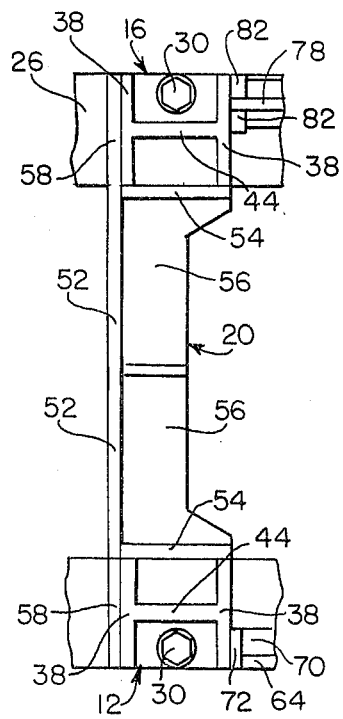
Figure 14:
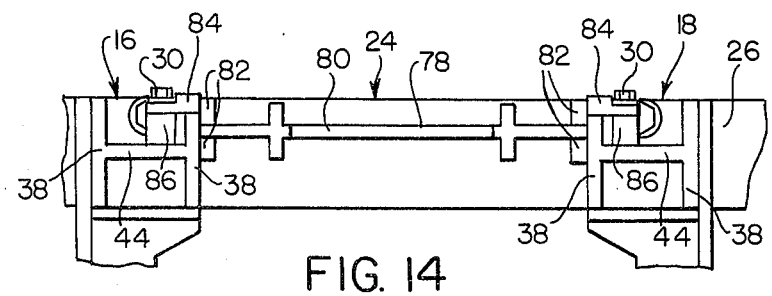
FIG. 14 is a top plan view of the yoke plate member.
Figure 15:
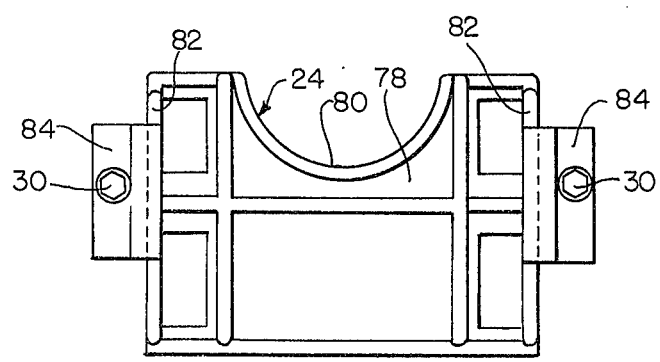
FIG. 15 is a front elevational view of the yoke plate member.
Figure 16:
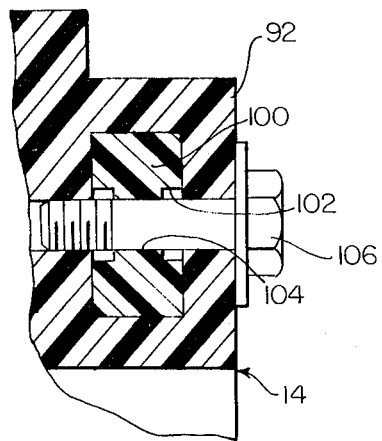
FIG. 16 is a vertical transverse sectional view of the pin slidingly mounted in the right front corner post.
Figure 17:
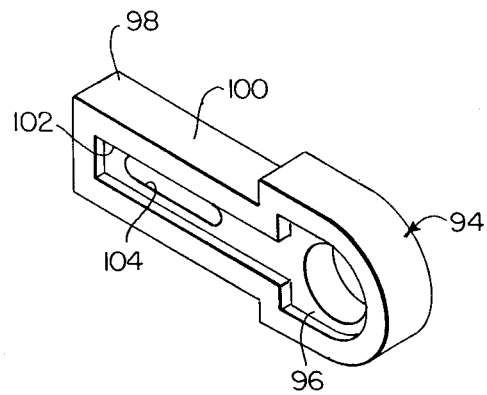
FIG. 17 is a perspective view of the sliding pin.
Figure 18:
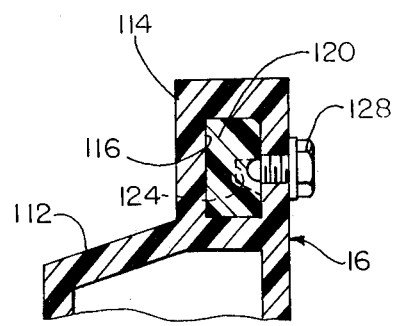
FIG. 18 is a vertical transverse sectional view of the key slidingly mounted in the left rear corner post.
Figure 19:
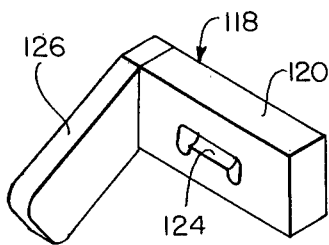
FIG. 19 is a perspective view of the sliding key.

The front left corner post 12 is shown quite clearly in FIGS. 2, 5 and 10. The upper distal end of the corner post is provided with a plurality of engine rest surfaces and engine securing projections 90 to limit and restrict movement longitudinally and transversely of the supporting rails 26, 26 to which the corner post is secured by the threaded fastener 30 at its bottom pad 40.

The front right corner post 14, similarly anchored to the support rail 26, is provided at its upper distal end with engine rest surfaces and movement limiting upstanding projections or lugs 92, as more clearly illustrated in FIGS. 2, 3, 5, 6 and 7. The upper end of the corner post is further provided with a sliding key or pin 94 having a finger gripping portion 96 at is proximal end and an engine engaging pin 98 at its distal end. Its body portion 100 is provided with a longitudinally extending recess 102 and a slot 104 in the recess. A threaded bolt 106, secured to the body of the corner post lug 92, has its shank passed through the slot 104 whereby movement of the engine engaging pin 94 is limited in its travel outwardly of the corner post projection 92 through which it moves.

The left rear corner post 16 is provided at its upper distal end with an angular engine supporting surface 112 and the upstanding projection 114 which is provided with a passage 116 there through for the pin member 118. The pin is provided with an engine engaging distal end 120, the body portion 122 having a recess 124 extending longitudinally on one side thereof and a finger gripping portion 126 for actuating the pin in its slot 116. A short bolt 128 is threadedly secured in one side of the upstanding projection 114 for engagement with the body portion 120 in its slot or recess 124 to limit outward travel of the pin.

The right rear corner post 18 is provided at its upper distal end with an engine rest surface and projection 130 to support and limit longitudinal and transverse movement of the engine E. The corner post 18 is fully illustrated in FIGS. 3, 5, 6 and 8.

The function of the corner posts 12, 14, 16 and 18, connected by the front transverse bar 22, the rear yoke plate 24 and the two lateral cross members 20, 20 is to provide support for and distribute the load and translation forces throughout the plastic components. The keys or pins 94 and 118 engage the engine at elements below the distal ends 98 and 120 respectively to check and prevent upward travel of the engine during its translation on the support rails 26, 26.

The plastic components of the cradle 10, except for the fasteners which are metallic, are fabricated by integral unitary molding of suitable plastic materials including but not limited to the DuPont Zytel ST Nylon material. Such material can, if necessary, be reinforced for tensile and compressive strength with fiber glass filaments. V-shaped engines weighing several hundred pounds are safely translated and protected by and in the cradle made of this plastic material. In the event that any component of the cradle 10 should be damaged, its repair is extremely fast to place the cradle back in "as new" condition. The few plastic components and fasteners required for repair or replacement are carried in crib stocks for maintenance of cradles damaged by misuse or abuse. Engines are not subject to damage by the plastic cradle itself, a frequent occurrence in steel cradles and racks.

Having disclosed herein certain particular preferred embodiments of the invention for purposes of explanation, further modifications or variations thereof, after study of this specification, will or may occur or become apparent to persons skilled in the art to which the invention pertains. Reference should be had to the appended claims in determining the scope of the invention.

I claim:

1. A plastic engine cradle fully open at its top and bottom sides for securement to a pair of longitudinally extending support rails or a supporting platform or rack of a material handling system comprising
   a plurality of integrally molded unitary spaced apart upstanding plastic corner posts,
   an integrally molded unitary front transverse plastic bar connected at its lateral distal ends terminating in two adjacent bifurcated flanges disposed in right angle planes to a first pair of said corner posts, an integrally molded unitary rear plastic yoke plate member connected at its lateral distal ends terminating in two adjacent bifurcated flanges disposed in right angle planes to a second pair of said corner posts,
   a pair of integrally molded unitary rigid plastic x-shaped cross members defining the lateral sides of said cradle and connected at their lateral distal ends terminating in two adjacent bifurcated flanges disposed in right angles planes to said pairs of corner posts,
   said bifurcated flanges comprising an outwardly facing flange and an inwardly directed flange,
   means secured to said inwardly directed flanges and affixed to said front transverse bar, said yoke plate member and said x-shaped cross members reinforcing and/or bracing said inwardly directed flanges against said corner posts,
   and fastening means removably securing the aforesaid integrally molded unitary plastic components rigidly together into an engine supporting cradle.

2. The plastic engine cradle defined in claim 1, wherein each said corner post comprises
   a pair of inner and outer sides walls and an intermediate connecting web portion therebetween,
   a bottom plate or rest pad at its lower distal end slotted at its outer frontal edge for the admission of fastening means to secure said corner post to said support rails or supporting platform or rack,
   and engine rest surfaces and upstanding projections at its upper distal end for support of and engagement with engine elements at rest thereon.

3. The plastic engine cradle defined in claim 2, including a frontal boss on said intermediate connecting web portion of each said corner post for attachment thereto of said front transverse bar or said rear yoke plate member.

4. The plastic engine cradle defined in claim 2, wherein the outer side walls of each said corner post are notched at their frontal edges for admission of fastening means securing the distal ends of said x-shaped cross members to said corner posts.

5. The plastic engine cradle defined in claim 3, wherein said front traverse bar comprises
   a longitudinally extending body member having an inwardly directed stiffening rib on its inner surface,
   said stiffening rib terminating in lateral transverse flanges in abutting bearing contact with said inner side walls of adjacent corner posts,
   and distal end flanges extending beyond said lateral transverse flanges, substantially at right angles thereto, and in the plane of said body member removably connected to said adjacent corner posts at said bosses.

6. The plastic engine cradle defined in claim 5, wherein said removable securing means comprises
   a plurality of threaded fasteners.

7. The plastic engine cradle defined in claim 3, wherein said rear yoke plate member comprises
   a body terminating at its lateral ends in flanges removably attached to adjacent corner posts,
   the inner side walls of said adjacent corner posts being notched for admission thereinto of said yoke plate member lateral flanges,
   said lateral flanges, in the plane of said rear yoke plate member body, being removably connected to said adjacent corner posts at said bosses.

8. The plastic engine cradle defined in claim 7, wherein said rear yoke plate member further comprises inwardly directed flanges adjacent the inner edges of said lateral end flanges and substantially at right angles thereto for abutting bearing contact with and against the inner side walls of said adjacent corner posts.

9. The plastic engine cradle defined in claim 5, wherein said front bar lateral transverse flanges are substantially parallel.

10. The plastic engine cradle defined in claim 8, wherein said rear yoke plate member inwardly directed flanges are substantially parallel.

11. The plastic engine cradle defined in claim 2, wherein said x-shaped cross members comprise an x-shaped body having longitudinally extending arms terminating at their distal ends in flanges removably secured to the outer walls of said corner posts.

12. The plastic engine cradle defined in claim 11, wherein said cross member arms are provided with inwardly directed stiffening ribs terminating in lateral transverse upper and lower flanges in abutting bearing contact with and against the inner edges of said outer and inner side walls of said corner posts, said lateral transverse flanges lying in substantially parallel planes and substantially at right angles to said arms distal end flanges.

13. The plastic engine cradle defined in claim 2, including a key or pin movably mounted on an upstanding projection of at least two said corner posts and engageable with engine elements at rest on said surfaces, to check said engine against upward movement out of said cradle.

14. The plastic engine cradle defined in claim 13, wherein said keys or pins are movable substantially horizontally for engagement with said engine elements.

15. The plastic engine cradle defined in claim 2, including engine restraint means movably mounted on at least two said corner posts and removably engagable with engine elements at rest on said surfaces, to check said engine against upward movement out of said cradle.

16. The plastic engine cradle defined in claim 1, wherein said reinforcing and/or bracing means comprises
a longitudinally extending rib affixed to the inward sides of said front transverse bar, said yoke plate member and said x-shaped cross members.

17. The plastic engine cradle defined in claim 16, wherein said reinforcing and/or bracing ribs are integrally formed with said front transverse bar, said yoke plate member and said x-shaped cross members.

18. The plastic engine crade defined in claim 1, including fastening means detachably securing said outwardly facing flanges of said front transverse bar, said yoke plate member, and said x-shaped cross members to said corner posts.

* * * * *